US009111235B2

(12) United States Patent
Sabharwal

(10) Patent No.: US 9,111,235 B2
(45) Date of Patent: Aug. 18, 2015

(54) METHOD AND SYSTEM TO EVALUATE RISK OF CONFIGURATION CHANGES IN AN INFORMATION SYSTEM

(75) Inventor: Navin Sabharwal, New Delhi (IN)

(73) Assignee: HCL America Inc., Sunnyvale, CA (US)

( * ) Notice: Subject to any disclaimer, the term of this patent is extended or adjusted under 35 U.S.C. 154(b) by 0 days.

(21) Appl. No.: 13/364,403

(22) Filed: Feb. 2, 2012

(65) Prior Publication Data

US 2013/0204837 A1    Aug. 8, 2013

(51) Int. Cl.
*G06F 7/04*     (2006.01)
*G06F 17/30*    (2006.01)
*G06Q 10/00*    (2012.01)
*G06F 9/44*     (2006.01)

(52) U.S. Cl.
CPC ...... *G06Q 10/00* (2013.01); *G06F 8/71* (2013.01); *G06F 17/30345* (2013.01); *G06F 17/30365* (2013.01)

(58) Field of Classification Search
CPC ............... G06F 17/30365; G06F 8/71; G06F 17/30289; G06F 17/30345

USPC .......................................... 707/624; 709/224
See application file for complete search history.

(56) References Cited

U.S. PATENT DOCUMENTS

| | | | |
|---|---|---|---|
| 8,156,063 B1* | 4/2012 | Rahmouni et al. | 706/45 |
| 2007/0100892 A1* | 5/2007 | Kephart et al. | 707/200 |
| 2008/0183690 A1* | 7/2008 | Ramachandran | 707/5 |
| 2010/0179927 A1* | 7/2010 | Meher et al. | 706/11 |
| 2010/0241891 A1* | 9/2010 | Beasley | 714/1 |

* cited by examiner

*Primary Examiner* — Bruce Moser
(74) *Attorney, Agent, or Firm* — Schwegman Lundberg & Woessner, P.A.

(57) ABSTRACT

A system and method to manage configuration of an information system comprises an automated risk evaluation for a requested change of a configuration item in an information system. Change history information indicative of the effects of multiple historical changes to respective configuration items may accessed, and the automated risk evaluation may be based at least in part on the change history information. The requested change may be authorized or as part based on an assessment of a risk value which is calculated in the automated risk evaluation. Additional apparatus, systems, and methods are described.

26 Claims, 5 Drawing Sheets

METHOD AND SYSTEM TO EVALUATE RISK OF CONFIGURATION CHANGES IN AN INFORMATION SYSTEM

BACKGROUND

Configuration management databases (CMDBs) are repositories of information related to components or configuration items of information systems. Such information systems typically comprise an Information Technology (IT) infrastructure having respective IT components or configuration items such as servers, applications, terminals, and the like. The CMDB stores information not only with respect to the configuration items, but also stores information pertaining to the relationships of configuration items with other configuration items.

Enterprises supported by complex information systems, such as banks, IT companies and telephone companies, often maintain complex CMDBs. It is from time to time necessary or desirable to effect configuration changes to some of the configuration items of the information system. All configuration changes are, however, not always successful. A configuration change may, for example, fail in an instance where the installation or configuration change of an application on a particular hardware component results in malfunction of the hardware component or of another component in the information system. Proposed configuration changes may thus have associated risks of implementation. For example, decommissioning a server may result in the downtime of the applications hosted on it, which can result in multiple applications being unavailable—perhaps causing great inconvenience. Even successful configuration changes may occasionally have unforeseen consequences or effects that give rise to further incidents in the information system.

BRIEF DESCRIPTION OF DRAWINGS

Some embodiments are illustrated by way of example and not limitation in the figures of the accompanying drawings in which.

DETAILED DESCRIPTION

Figure 1:
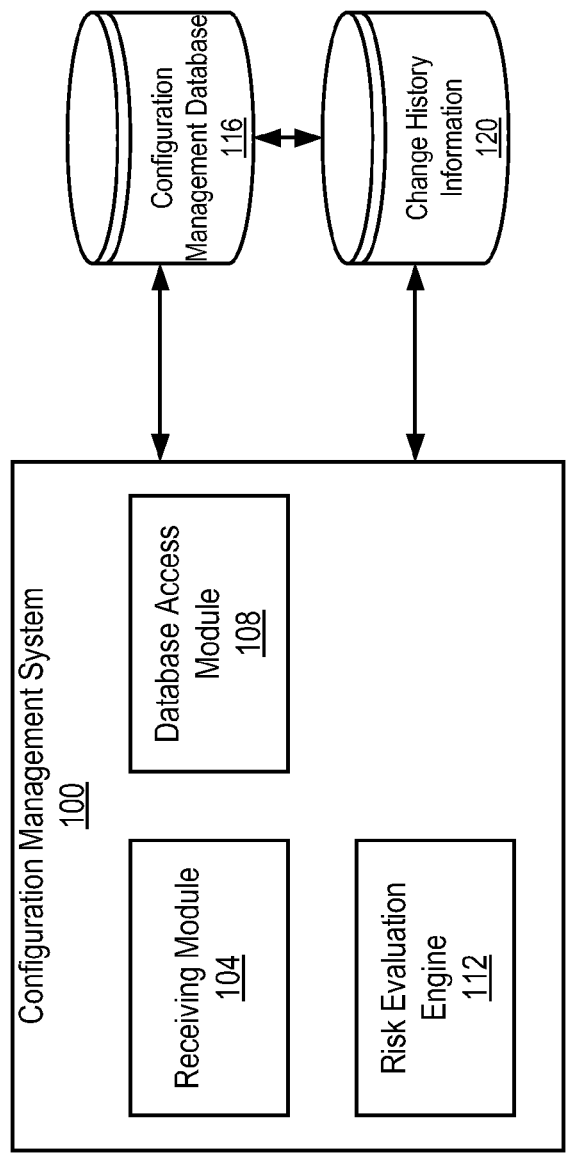
FIG. 1 is a high-level schematic diagram illustrating a system to manage configuration changes in an information system, in accordance with an example embodiment.

In the following description, for purposes of explanation, numerous specific details are set forth in order to provide a thorough understanding of some example embodiments. It will be evident, however, to one skilled in the art that embodiments of the present disclosure may be practiced without these specific details.

According to one example embodiment, there may be provided a method and system to assess or evaluate risks associated with a requested configuration change by automatically calculating a risk value or risk score which is based on or derived from historical information with respect to previous configuration changes. Such historical information may include information with respect to the impact of configuration items or components associated with previous changes.

The example system may comprise a receiving module to receive a request for change of a configuration item in a configuration management database that contains a plurality of configuration items for respective components in an Information Technology (IT) infrastructure; a database access module to access change history information that indicates respective effects of multiple historical changes to respective prior configuration items; and a hardware implemented risk evaluation module to perform, using one or more processors, an automated risk evaluation for the requested change of the configuration item based on the change history information, to produce a risk value indicative of a risk associated with the requested change of the configuration item.

The system may include one or more memories that can be used to store the configuration management database and the change history information. In embodiments, the change history information may be maintained separately from the configuration management database while, in other embodiments, the change history information may be integrated with the configuration management database. At least some change history information with respect to each configuration item may, for example, be included in the CMDB in association with entries for respective configuration items in the configuration management database.

The risk evaluation module may be configured to determine whether or not the risk value or risk score is greater than a threshold value, and to disallow or refuse authorization of the requested change based on a determination that the risk value is greater than the threshold value. The system may further include a change history update module to include, subsequent to disallowance of the requested change, the requested change in the change history information.

Instead, or in a addition, the risk evaluation module may be configured to determine whether or not the risk value is greater than a threshold value, and to allow the requested change of the configuration item based on a determination that the risk value is smaller than the threshold value. The change history update module may in such case be configured to include the requested change in the change history information, subsequent to implementation of the requested change. The change history update module may further be configured to determine the effect of implementation of the requested change, and to include the determined effect in the change history information in association with information regarding the requested change.

The automated risk evaluation may include automatic identification from the change history information of a subset of historical changes that are similar to the requested change, the automated risk evaluation further comprising calculating the risk value based at least in part on the effects of the subset of historical changes. In some instances, the subset of historical changes are historical changes that are identical to the requested change, e.g. relating to the same configuration item and being a request for change that is identical in type to respective historical changes in the subset of historical changes. In other embodiments, the subset may identify based on predefined rules that define a degree of similarity within which a historical change is included in the subset. For example, the subset may be limited to identical changes to analogous configuration items, to analogous changes to identical configuration items, or to analogous changes to analogous configuration items.

Automated risk evaluation may comprise assigning a weight to each historical change in the subset of historical changes. The weight assigned to each historical change in the subset of historical changes may at least in part be based on an associated success type of the respective historical change. The success type for the respective historical changes may indicate one or more of the following conditions: that the historical change was successful in that the historical change was authorized, performed and yielded desired results; that the historical change failed in that the historical change was authorized and performed, but did not yield expected results; that the historical change was approved and/or authorized, but was canceled before implementation thereof; and that the historical change caused new incidents. In some instances, the success type of the historical changes may include changes which were requested but were not authorized and were therefore never implemented.

The automated risk evaluation may further include retrieving information with respect to one or more impacted configuration items that were affected by respective historical changes in the subset of historical changes, and to assign a weight to respective impacted configuration items. The calculated risk value may therefore be based at least in part on information with respect to the impact which previous configuration changes had on associated configuration items or components. The weight assigned to each impacted configuration item is at least in part based on a type of change of the corresponding historical change. For example, impacted configuration items for which the type of associated historical change is more similar to that of the requested change may be assigned a greater weight than impacted configuration items for which the associated historical change is less similar than the requested change. The weight assigned to each configuration item may similarly be base, at least in part, on a type of configuration item of the respective impacted configuration items.

Architecture

Figure 2:
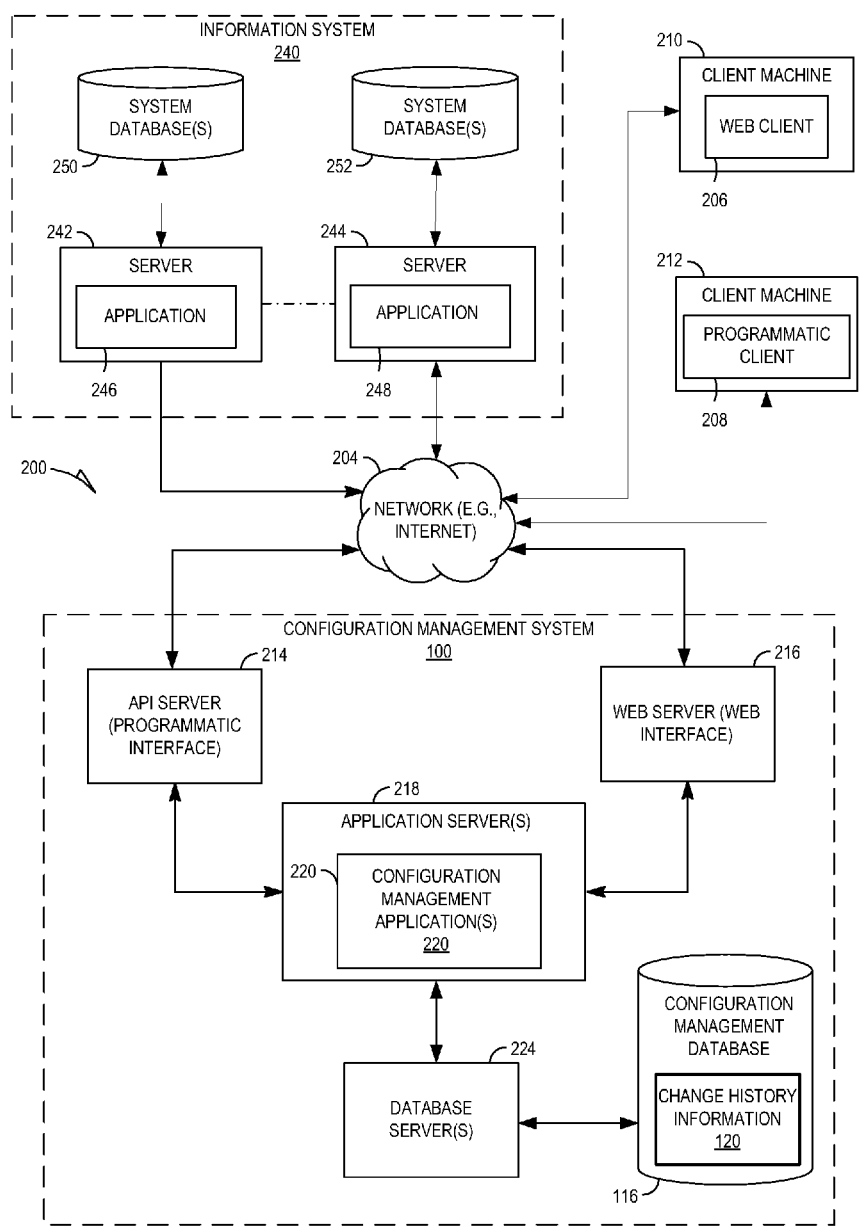
FIG. 2 is a lower-level schematic diagram illustrating a configuration management system in accordance with a further example embodiment.

FIG. 1 is a high-level schematic diagram of a configuration management system 100 to evaluate the risk associated with configuration changes in an information system (see FIG. 2). The system 100 comprises a receiving module 104 to receive requests for change of configuration items in a configuration management database 116. The configuration management database 116 contains structured information regarding the configuration of multiple components in an information system that comprises an IT infrastructure. Each such component in the IT infrastructure has one or more corresponding configuration items in the configuration management database 116, to indicate particulars of the configuration of the relevant component. Each request for change of a configuration item thus indicates a request that the configuration of one or more system components be changed, and that one or more corresponding configuration items in the configuration management database 116 therefore be changed.

Change history information 120 is provided in association with the configuration management database 116. The change history information 120 includes indications of multiple historical changes to respective configuration items or IT components, together with respective effects of the historical changes. The configuration management system 100 includes a database access module 108 to access the change history information 120 responsive to reception of a request for change of a configuration item.

The configuration management system 100 further includes a risk evaluation engine 112 to perform an automated risk evaluation with respect to the requested configuration change, based at least in part on the change history information 120. The automated risk analysis, in some embodiments, produces a risk value indicative of a risk associated with the requested change.

An Application Program Interface (API) server 214 and a web server 216 are coupled to, and provide programmatic and web interfaces respectively to, one or more application servers 218. The application servers 218 host one or more configuration management applications 220 (see FIG. 2). The application server(s) 218 are, in turn, shown to be coupled to one or more databases server(s) 224 that facilitate access to one or more database(s) that includes the configuration management database 116. In the example embodiment of FIG. 2, the change history information 120 is shown as being included in the configuration management database 116, but, in other embodiments the change history information 120 may instead, or in addition, be stored in one or more memories separate from the configuration management database 116.

The configuration management system 100 is also in communication with an information system 240 having an IT infrastructure comprising multiple IT components. The information system 240 may, for example, be a client enterprise system which supports a business enterprise. The information system 240 may, e.g., include IT components in the form of servers 242, 244, software applications 246, 248, and system databases 250, 252. It will be appreciated that the enterprise system 240 may typically comprise a greater number of process servers 242, 244 and process datastores 250, 252, but FIG. 2 shows only two such process servers 242, 244, for ease of explanation. Further components of the information system 240 may include various user devices which form part of an information network or computer network provided by the information system 240, such as, for example, user terminals or client computers, software applications executing on user devices, printers, scanners, and the like.

The configuration management application(s) 220 may provide a number of automated configuration management functions and may also provide a number of functions and services to users that access the configuration management system 100, for example providing analytics, diagnostic, predictive and management functionality relating to the management of configuration of components of the information system 240. Respective modules for providing these functionalities are discussed in further detail with reference to FIG. 3 below. While all of the functional modules, and therefore all of the configuration management application(s) 220 are shown in FIG. 2 to form part of the configuration management system 100, it will be appreciated that, in alternative embodiments, some of the functional modules or configuration management applications may form part of systems that are separate and distinct from the configuration management system 100.

The web client 206 accesses the configuration management application(s) 220 via the web interface supported by the web server 216. Similarly, the programmatic client 208 accesses the various services and functions provided by the configuration management application(s) 220 via the programmatic interface provided by the API server 214.

Further, while the system 200 shown in FIG. 2 employs a client-server architecture, the example embodiments are of course not limited to such an architecture, and could equally well find application in a distributed, or peer-to-peer, architecture system, for example. The configuration management application(s) 220 could also be implemented as standalone software programs, which do not necessarily have networking capabilities.

Configuration Management Application(s)

Figure 3:
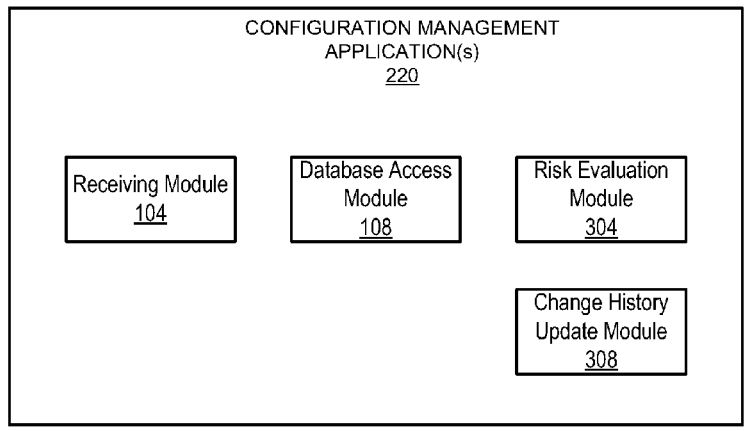
FIG. 3 is a diagrammatic view of configuration management application(s) forming part of the configuration management system of FIG. 2.

FIG. 3 is a block diagram illustrating multiple functional modules of the configuration management application(s) 220 of the exemplary configuration management system 100 of FIG. 2. Although the example modules are illustrated as forming part of a single application, it will be appreciated that the modules may be provided by a plurality of applications The modules of the application(s) 220 may be hosted on dedicated or shared server machines (not shown) that are communicatively coupled to enable communications between server machines. The modules themselves are communicatively coupled (e.g., via appropriate interfaces) to each other and to various data sources, so as to allow information to be passed between the modules or so as to allow the modules to share and access common data. The modules of the application(s) 220 may furthermore access the configuration management database 116 and the change history information 120 via the database server(s) 224.

The configuration management application(s) 220 may include the receiving module 104 and the database access module 108, as described above with reference to FIG. 1. The configuration management application(s) 220 may further include a risk evaluation module 304 that is configured to provide the functionality of a risk evaluation engine 112 (as described with reference to FIG. 1), when executed by one or more computer processors.

The configuration management application(s) 220 may further include a change history update module 308 to update the change history information 120 responsive to implementation of a requested change, so that any requested change which is authorized and implemented is included in the change history information 120. The history update module 308 may be configured to determine the effects of implementing requested changes, and to include information regarding such effects in the change history information 120.

Further functionality of the configuration management application(s) 220 will be evident from description below of example embodiments of a method of managing configuration of components in the information system 240.

Figure 4:
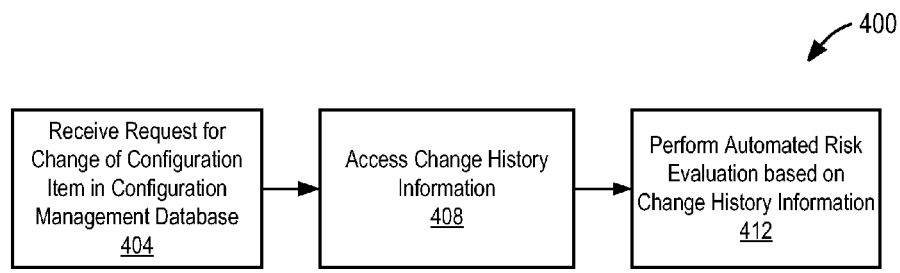
FIG. 4 is a flow chart illustrating an example embodiment of a method to manage social relationships, according to an example embodiment.

FIG. 4 is a flow chart illustrating, at a high level, a method 400, in accordance with an example embodiment, to manage configuration of components in an information system. The method 400 may be performed by any of the modules, logic, or components described above with reference to FIGS. 1-3. The method 400 may comprise receiving a request for change of a configuration item in the configuration management database 116, at operation 404, the configuration item corresponding to an IT component of the information system 240. The change history information 120 may thereafter be accessed, at operation 408, e.g. to retrieve information regarding historical configuration changes pertinent to the requested change. Automated risk evaluation is then performed, at operation 412, based on the retrieved change history information 120, to produce a risk value indicating the risk associated with the requested change of the relevant configuration item. Based on the relationship of the risk value to a predetermined threshold value, the requested change may either be allowed or disallowed (discussed in more detail with respect to FIG. 5, below). The method 400 thus provides for automated risk assessment, analysis or evaluation based on information with respect to prior configuration changes.

Figure 5:
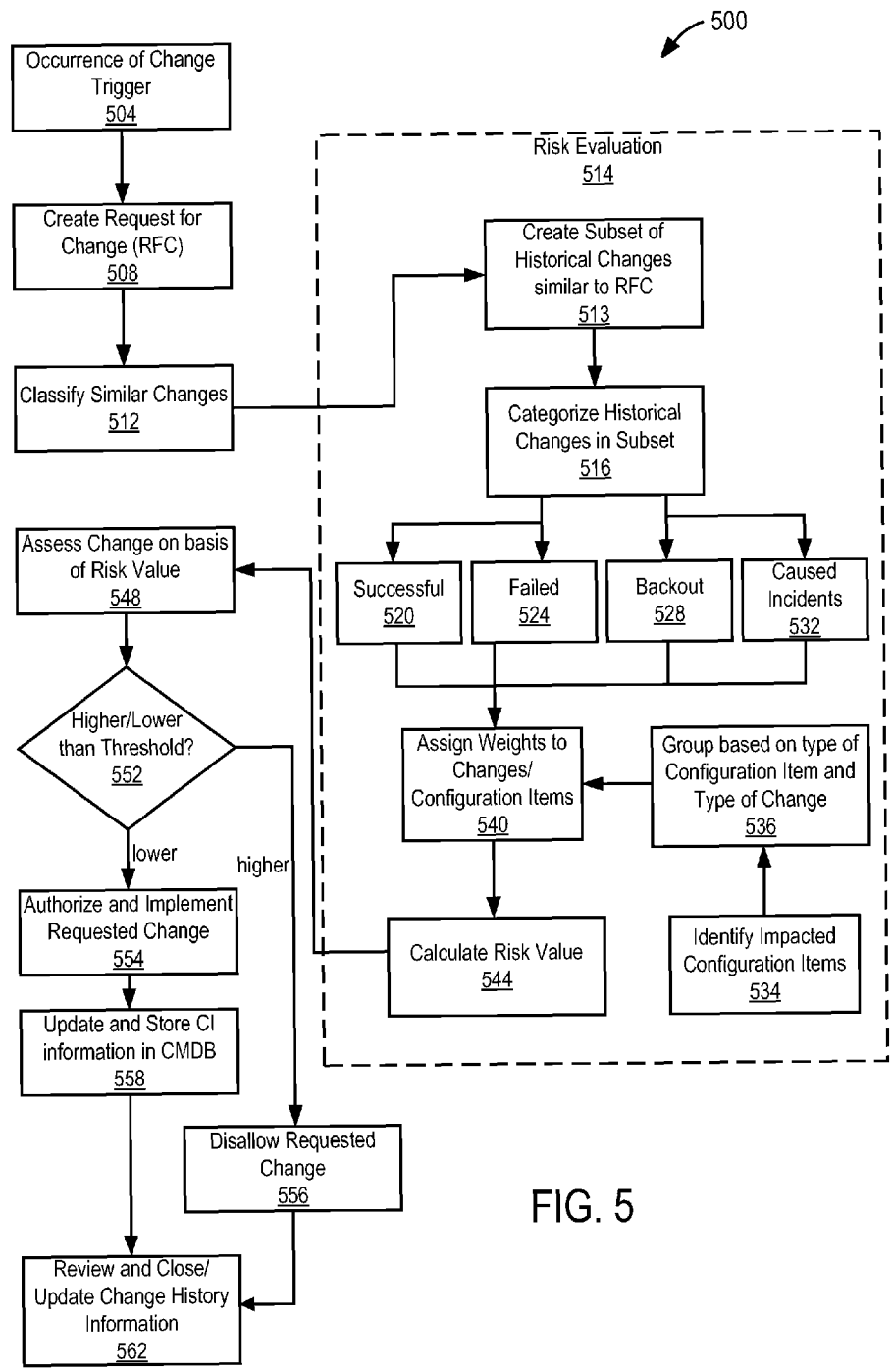
FIG. 5 is flow chart illustrating another example embodiment of a method to manage configuration changes in an information system.

FIG. 5 is a flowchart illustrating in greater detail the example method 500 to manage component configuration in accordance with the example embodiment. Referring now to FIGS. 1, 2, and 5, it can be seen that the method 500 may be initiated at operation 504 when a trigger occurs which may give rise to a request for change in configuration of a component of the information system 240 (FIG. 2), configuration of the relevant component being represented in the CMDB 116 by a corresponding configuration item. In some embodiments, the change trigger comprises the occurrence of a memory dump on server 246. A root cause analysis may be performed with respect to the memory dump, and it may be determined that a new Random Access Memory (RAM) component is required for the server 246, to replace a faulty one.

A request for change (RFC) may be created, at operation 508, and communicated to the configuration management system 100. The request for change may indicate the configuration item to which the requested change pertains, in this example the server 246. The request for change may further indicate the type of change that is required, in this example indicating that replacement of the RAM of the relevant server is desired.

Upon receipt of the request for change, a record for the requested change is created and similar changes that are to be considered for evaluating a risk associate with the requested change are classified, at operation 512. This may, for example, be accomplished by way of a business rule which is to be applied to the configuration management database 116 and/or change history information 120. In some embodiments, the classification of similar changes may be such that only identical historical changes are to be identified for inclusion in subset of historical changes with respect to which a risk value is to be calculated, as described below.

An identical historical change is the same type of change as the requested change, performed with respect to the same configuration item as that to which the request for change pertains. An identical change in the present example may thus comprise a prior RAM replacement for the server 246. In other embodiments, the business rule defined or selected at operation 512 to identify similar historical changes may be configured to identify not only historical changes which are identical to the request for change, but also to identify at least some historical changes that are non-identical but similar to the requested change. For example, historical changes for an identical type of change to a similar type of configuration item may be identified so that, for example, a RAM change to other servers, or to other servers of a type or configuration similar to server 246 may be identified, in the present example.

Instead, or in addition, historical changes for a similar type of change to the relevant configuration item or component may also be included, so that, in the present example, a RAM extension for the server 246 is also identified for inclusion in a subset of historical changes upon which calculation of a risk value may, in part, be based. In present example embodiment, the rule applied at operation 512 is to find or identify similar RAM installation changes which have occurred in the past on the same server 246 or in other servers forming part of the information system 240.

The method thereafter comprises performing automated risk evaluation, at operation 514. The automated risk evaluation includes creating a subset of historical changes similar to the requested change, at operation 513. To this end information that indicates historical changes to configuration items in the configuration management database 116 is searched based on pre-specified criteria or based on criteria specified at operation 512, to identify historical changes satisfying the applicable requirement.

In some example embodiments, such as data structure illustrated with references to FIG. 2, distinct change history information 120 is maintained in association with records pertaining to respective configuration items in the configuration management database 116. The creation of the subset of historical changes may in such case comprise searching through the change history information 120 to identify respective historical changes that satisfy the relevant criteria.

In some embodiments, change history information with respect to historical changes to configuration items in the configuration management database 116 may form an integral part of the configuration management database 116, so that the change history information 120 is not separate from configuration entry information. The configuration management database 116 may is such cases include fields related to previous configuration changes of respective configuration items, for example together with information about the effects of the respective changes. In such instances, the operation, at 513, of creating a subset of historical changes may include searching the configuration management database 116 to identify historical changes that meet the requirements.

In the present example embodiment, an identical historical change is identified in which RAM of the server 246 was replaced. It will be appreciated that the number of historical changes identified to form part of the subset may vary from instance to instance and may, in some examples, comprise a single historical change or an empty set.

The method 500 thereafter comprises categorizing the historical changes in the identified subset, at operation 516, according to the effect or success type of the respective historical changes. In the example embodiment, the risk evaluation module 304 is configured to categorize the subset of historical changes into four categories, namely successful changes, at 520, failed changes, at 524, backout changes, at 528, and changes that caused further incidents, at 532.

Successful changes are those changes that were authorized, implemented, and thereafter yielded desired results. In contrast, failed changes are changes which were authorized and implemented, but which did not produce expected outcomes or results. Backout changes are changes which were approved or authorized, but which were called back before being implemented. Changes that caused incidents are those changes which generated or caused new incidents due to their implementation. In the present example embodiment, the prior change in which the RAM of the server 246 was replaced is categorized as having been successful. The automated risk evaluation 514 is therefore based at least in part on the effects of the subset of historical changes.

The method 500 may include identifying configuration items of the configuration management database 116 which have been impacted by respective historical changes in the subset, at operation 534. To this end, the change history information 120 may include a description of each historical change, as well as information regarding configuration items or components of the information system 240 that are impacted by respective historical configuration changes. Changing, for example, an operating system on a particular configuration item or component may have impacts on other IT components, for example leading to malfunction of a networked component or requiring a change in configuration of one or more connected components. The identification of impacted configuration items, at operation 534, is performed for the historical changes in the subset regardless of whether or not the respective historical changes were successful.

The identified impacted items are then grouped, at operation 536, according to predefined rules. The impacted configuration items may be grouped, for example, according to the type of configuration item. Instead, or in addition, the impacted configuration items may be grouped according to the type of change which gave rise to the impact on the respective impacted configuration items. In the present example embodiment, identified configuration items impacted by the prior RAM change of the server 246 are grouped according to type of configuration item.

Weights may be assigned to the categorized historical changes 520-532 and also to the grouped impacted configuration items. In the example embodiment, items/changes in each group are assigned a similar weight. All changes that were successful are therefore assigned the same weight, while all failed changes, for example, are assigned another weight. Likewise, all impacted configuration items in the same group (e.g., being a configuration item of a particular type) may be assigned the same weight. The assignment of weights to the respective changes and impacted configuration items may be in accordance with predefined rules.

Successful changes, for example, may be assigned a lower weight than failed changes. Likewise, weights assigned to different groups of impacted configuration items may vary according to the effect or success type of the associated change. Thus, for example, configuration items impacted by a successful change may be assigned a smaller weight than configuration items impacted by a change that caused incidents. In one embodiment, historical changes may be assigned weights in descending order according to a sequence comprising changes causing incidents, changes causing backout, failed changes, and successful changes.

Instead, or in addition, predefined rules upon which the assignment of weights by the risk evaluation module 304 assigns weights to groups of impacted configuration item may be such that some type of impacted configuration items are assigned greater weights that other configuration items, for example based on the criticality or potential further impact of the configuration item. A router may, for example, be assigned a greater weight than a user device, such as a personal computer. A configuration item which is critical for running a service or making a service work in desired fashion may for example be given more weight based on the fact that other configuration items are critically dependent on correct performance of the configuration item under consideration. For example, a router that is incorrectly configured responsive to a change request may cause routing of critical information to insecure nodes, which may cause information leakage having a serious business impact.

A risk value is thereafter calculated, at operation 544, based on the weights assigned to the respective historical changes and/or impacted configuration items. The risk value may in some embodiments be calculated by a simple summation of the weights assigned to the respective historical changes and/or previously impacted configuration items in operation 540. In other embodiments, the risk value may be calculated with a predefined formula based on the assigned weights]. In one embodiment, the respective assigned weights may be expressed in percentages or fractions. In such cases, the risk value may be calculated by taking the product of the assigned weights. In some instances, the weights or fractions may be smaller or equal to 100% or unity, as the case may be, so that a maximum risk value of 100% or 1 may be obtained. It will be appreciated that other suitable mathematical models for attaching weights to respective elements, and calculating a compound risk value based on the associated weights may be employed.

A change request, for instance, pertaining to updating an IP routing table of a particular router may employ two parameters for risk impact calculation, a first parameter being a weightage or non-success rate of relevant past change tickets, and a second parameter being criticality of the configuration item in question, e.g. the router. If, for example, the rate of similar but non-successful past changes (e.g., failed, backout, and incident-causing changes) for the same configuration item type is 30%, and the criticality of the configuration item is weighed at 100%, then a risk value associated with the requested change may be calculated, in accordance with an example embodiment, to be 0.3. The risk value thus calculated may be assigned to the associated change ticket for change authorization.

The risk associated with the requested change is then assessed, at operation 548, based on the calculated risk value or score. In the current example embodiment, the calculated risk value is compared to a predefined threshold, at operation 552. The comparison may be performed automatically by the risk evaluation engine 112. If the risk value is relatively low, e.g. being lower than the threshold value, then the requested change is allowed or authorized and is implemented, at operation 554. In the present example, the RAM of the server 246 is therefore replaced, at operation 554, if the risk value is established to be lower than the threshold value.

After implementing the requested change, a record or entry for the relevant configuration item(s) in the configuration management database 116 may be updated, at operation 558, to reflect changes to all configuration items impacted by the implemented change. A configuration item with respect to the server 246 may thus, for example, be updated to reflect the updated configuration of the server 246, including the updated RAM. The updating information, at operation 558, may also include updating the change history information 120 to reflect the implemented change. In instances in which the change history information 120 forms an integrated part of the configuration management database 116, a record for the relevant configuration item in the configuration management database 116 may be updated with, for example, information indicating the date and nature of the implemented change. In instances in which the change history information 120 is maintained separately, an entry for the implemented change may be created and stored as part of the change history information 120.

The method 500 may further comprise reviewing and updating the change history information 120, at operation 562. The effects of the implemented changes may thus be noted and recorded in the change history information 120. The change history information 120 may thus be updated to indicate whether the implemented change was successful, failed, or caused further incidents. Such updated information is therefore available for use in future automated risk evaluation, so that the change history information 120 is dynamically updated. Accuracy of the automated risk evaluation may thus be progressively refined as more configuration changes to the information system 240 are implemented and recorded in the configuration management database 116 and/or the change history information 120.

If however, it is determined at operation 552 that the calculated risk value is relatively high, e.g. being higher than the threshold value, the requested change is disallowed or is not authorized, at operation 556. The change history information 120 is thereafter updated, at operation 562, to record that that the requested change was not authorized.

It is an advantage of the above-described method and system that some embodiments enable integration of a configuration change management system with a configuration management database in order to identify configuration items that may be impacted by a requested change. Risks associate with a particular change may therefore be assessed in a process that is at least partly automated, the risk evaluation being derived in part from past information, e.g., change history information, that may be contained in the configuration management database.

Yet a further advantage of some embodiments is that the automated risk evaluation may at least in part be based on prior changes that were not authorized, prior changes that were authorized but not implemented, and/or prior changes that were authorized and implemented but which were not successful or caused further incidents.

A pre-emptive risk evaluation process may be expedited by the automated nature of calculation of the risk evaluation process. Change history information on which automated risk evaluation is partly based may further be updated dynamically, so that the method includes a feedback loop to provide a risk evaluation process that is self-learning or adaptive in some respects.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 6:
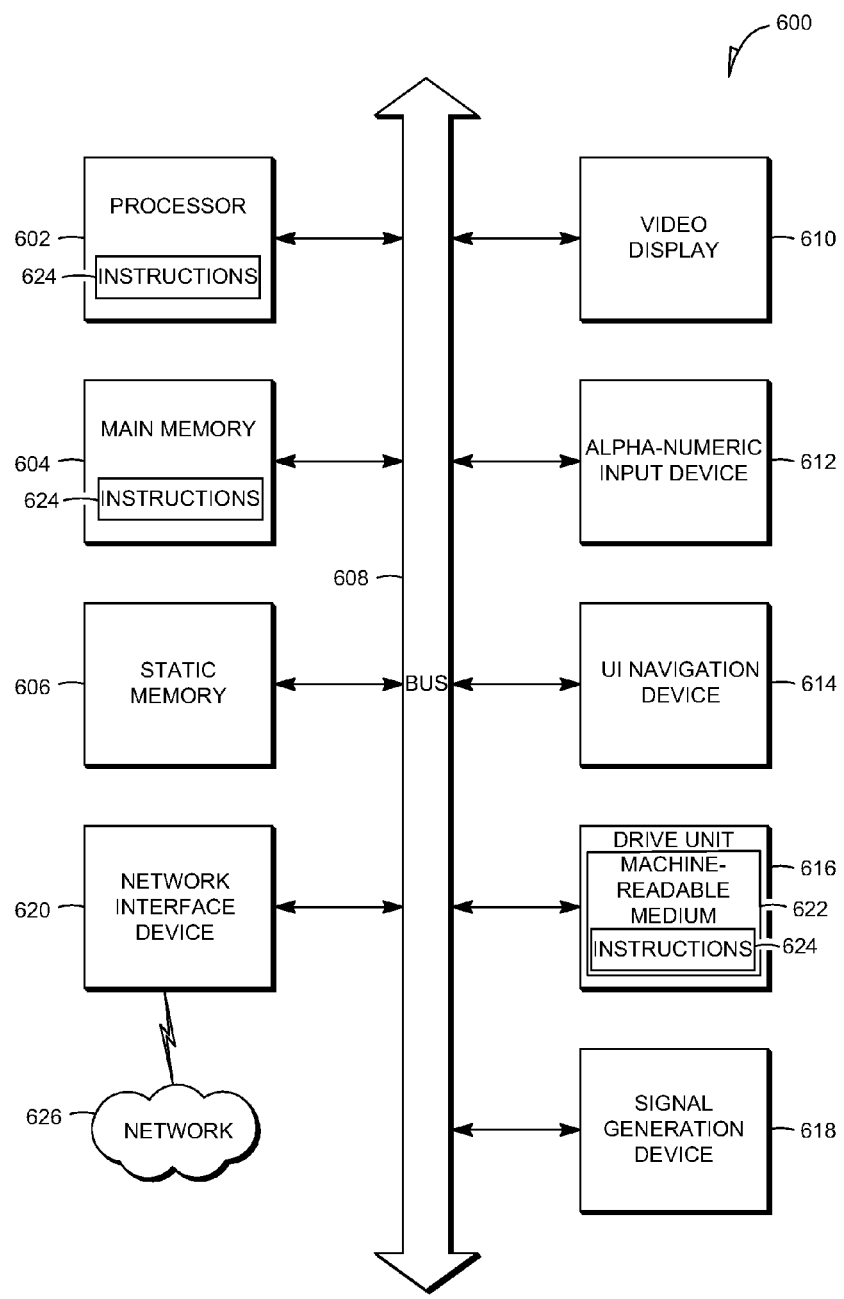
FIG. 6 is a block diagram of a machine in the example form of a computer system within which a set instructions for causing the machine to perform any one or more of the methodologies discussed herein may be executed.

FIG. 6 is a block diagram of machine in the example form of a computer system 600 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker) and a network interface device 620.

Machine-Readable Medium

The disk drive unit 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
one or more processors;
a receiving module to receive a request for change of a configuration item in a configuration management database that contains a plurality of configuration items for respective components in an Information Technology (IT) infrastructure;
a database access module to access change history information that indicates respective effects of multiple historical changes to respective prior configuration items; and
a hardware-implemented risk evaluation module configured to perform, using one or more processors, an automated risk evaluation for the requested change of the configuration item based on the change history information, to produce a risk value indicative of a risk associated with the requested change of the configuration item, performance of the automated risk evaluation comprising:
identifying from the change history information a subset of historical changes that are associated with the requested change,
for each historical change in the identified subset, identifying a respective success type selected from a predetermined set of success types that comprises multiple different success types, and
for each historical change in the identified subset, assigning a respective weight selected from a predetermined set of weights that comprises multiple different weights, each of which corresponds to a respective success type in the predetermined set of success types.

2. The system of claim 1, further comprising one or more memories to store the configuration management database and the change history information.

3. The system of claim 1, wherein the risk evaluation module is configured to determine whether or not the risk value is greater than a threshold value, and to disallow the requested change of the configuration item based on a determination that the risk value is greater than the threshold value.

4. The system of claim 3, further comprising a change history update module to include, subsequent to disallowance of the requested change, the requested change in the change history information.

5. The system of claim 1, wherein the risk evaluation module is configured to determine whether or not the risk value is greater than a threshold value, and to allow the requested change of the configuration item based on a determination that the risk value is smaller than the threshold value.

6. The system of claim 5, further comprising a change history update module to include the requested change in the change history information, subsequent to implementation of the requested change.

7. The system of claim 6, wherein the change history update module is configured to determine the effect of implementing the requested change, and to include the determined effect in the change history information in association with information regarding the requested change.

8. The system of claim 1, wherein the predetermined set of success types includes a success type which indicates that the corresponding historical change was successful in that the corresponding historical change was authorized, performed, and yielded expected results.

9. The system of claim 1, wherein the predetermined set of success types includes a success type which indicates that the corresponding historical change failed in that the corresponding historical change was authorized and performed, but did not yield expected results.

10. The system of claim 1, wherein the predetermined set of success types includes a success type which indicates that the corresponding historical change was approved and/or authorized, but was canceled before implementation thereof.

11. The system of claim 1, wherein the predetermined set of success types includes a success type which indicates that the corresponding historical change caused new incidents.

12. The system of claim 1, wherein the automated risk evaluation module is configured to retrieve information with respect to one or more impacted configuration items that were affected by respective historical changes in the subset of historical changes, and to assign a weight to respective impacted configuration items.

13. The system of claim 12, wherein the weight assigned to each impacted configuration item is at least in part based on a type of change of the corresponding historical change.

14. The system of claim 12, wherein the weight assigned to each configuration item is at least in part based on a type of configuration item of the respective impacted configuration items.

15. A method comprising:
receiving a request for change of a configuration item in a configuration management database that contains a plurality of configuration items for respective components in an Information Technology (IT) infrastructure;
accessing change history information that indicates respective effects of multiple historical changes to respective prior configuration items; and
performing, using one or more processors, an automated risk evaluation for the requested change of the configuration item based on the change history information, to produce a risk value indicative of a risk associated with the requested change of the configuration item, performance of the automated risk evaluation comprising
identifying from the change history information a subset of historical changes that are associated with the requested change,
for each historical change in the identified subset, identifying a respective success type selected from a predetermined set of success types that comprises multiple different success types, and
for each historical change in the identified subset, assigning a respective weight selected from a predetermined set of weights that comprises multiple different weights, each of which corresponds to a respective success type in the predetermined set of success types.

16. The method of claim 15, further comprising determining that the risk value is greater than a threshold value, and refusing authorization of the requested change of the configuration item based on the determination that the risk value is greater than the threshold value.

17. The method of claim 16, further comprising, subsequent to refusal of authorization of the requested change, including the requested change in the change history information.

18. The method of claim 15, further comprising determining that the risk value is smaller than a threshold value, and allowing the requested change of the configuration item based on the determination that the risk value is smaller than the threshold value.

19. The method of claim 18, further comprising, subsequent to implementing the requested change, including the requested change in the change history information.

20. The method of claim 19, further comprising determining the effect of implementing the requested change, and including the determined effect in the change history information in association with information regarding the requested change.

21. The method of claim 15, wherein the predetermined set of success types includes a success type which indicates that the corresponding historical change caused new incidents.

22. The method of claim 15, wherein the automated risk evaluation includes retrieving information with respect to one or more impacted configuration items that were affected by respective historical changes in the subset of historical changes, and assigning a weight to respective impacted configuration items.

23. The method of claim 22, wherein the weight assigned to each impacted configuration item is at least in part based on a type of change of the corresponding historical change.

24. The method of claim 22, wherein the weight assigned to each configuration item is at least in part based on a type of configuration item of the respective impacted configuration items.

25. A non-transitory machine-readable storage medium storing instructions which, when performed by a machine, cause the machine to operations comprising:
in response to receiving a request for change of a configuration item in a configuration management database that contains a plurality of configuration items for respective components in an Information Technology (IT) infrastructure, accessing change history information that indicates respective effects of multiple historical changes to respective prior configuration items; and
performing an automated risk evaluation for the requested change of the configuration item based on the change history information, to produce a risk value indicative of a risk associated with the requested change of the configuration item, performance of the automated risk evaluation comprising
identifying from the change history information a subset of historical changes that are associated with the requested change,
for each historical change in the identified subset, identifying a respective success type selected from a predetermined set of success types that comprises multiple different success types, and
for each historical change in the identified subset, assigning a respective weight selected from a predetermined set of weights that comprises multiple different weights, each of which corresponds to a respective success type in the predetermined set of success types.

26. A system comprising:
means for receiving a request for change of a configuration item in a configuration management database that contains a plurality of configuration items for respective components in an Information Technology (IT) infrastructure;
means for accessing change history information that indicates respective effects of multiple historical changes to respective prior configuration items; and means for performing an automated risk evaluation for the requested change of the configuration item based on the change history information, to produce a risk value indicative of a risk associated with the requested change of the configuration item, performance of the automated risk evaluation comprising identifying from the change history information a subset of historical changes that are associated with the requested change, for each historical change in the identified subset, identifying a respective success type selected from a predetermined set of success types that comprises multiple different success types, and for each historical change in the identified subset, assigning a respective weight selected from a predetermined set of weights that comprises multiple different weights, each of which corresponds to a respective success type in the predetermined set of success types.

* * * * *